United States Patent
Boock et al.

(10) Patent No.: US 6,891,845 B2
(45) Date of Patent: May 10, 2005

(54) METHOD AND APPARATUS FOR ADAPTING TO A CLOCK RATE TRANSITION IN A COMMUNICATIONS NETWORK USING IDLES

(75) Inventors: Michael Boock, Hamburg (DE); Michael Riepen, Hamburg (DE)

(73) Assignee: Intel Corporation, Santa Clara, CA (US)

(*) Notice: Subject to any disclaimer, the term of this patent is extended or adjusted under 35 U.S.C. 154(b) by 856 days.

(21) Appl. No.: 09/896,378

(22) Filed: Jun. 29, 2001

(65) Prior Publication Data

US 2003/0002516 A1 Jan. 2, 2003

(51) Int. Cl.[7] .............................................. H04L 12/28
(52) U.S. Cl. .................................... 370/412; 370/428
(58) Field of Search .................... 370/252, 412–419, 370/428, 465, 474, 505, 506, 516, 517

(56) References Cited

U.S. PATENT DOCUMENTS

| | | | | |
|---|---|---|---|---|
| 5,124,977 A | * | 6/1992 | Kozaki et al. | 370/392 |
| 5,410,540 A | * | 4/1995 | Aiki et al. | 370/428 |
| 5,710,770 A | * | 1/1998 | Kozaki et al. | 370/368 |
| 5,717,899 A | * | 2/1998 | Artieri | 711/150 |
| 5,778,419 A | * | 7/1998 | Hansen et al. | 711/112 |
| 5,898,687 A | * | 4/1999 | Harriman et al. | 370/390 |
| 6,463,057 B1 | * | 10/2002 | Kozaki et al. | 370/358 |
| 6,526,069 B1 | * | 2/2003 | Wolf et al. | 370/412 |
| 6,665,266 B1 | * | 12/2003 | Brunheroto et al. | 370/442 |
| 6,741,566 B1 | * | 5/2004 | Furlong et al. | 370/522 |
| 6,754,218 B1 | * | 6/2004 | Murakami | 370/412 |

\* cited by examiner

*Primary Examiner*—Chau Nguyen
*Assistant Examiner*—Andy Lee
(74) *Attorney, Agent, or Firm*—Blakely, Sokoloff, Taylor & Zafman LLP

(57) ABSTRACT

The present invention allows data transmissions to cross from one clock domain to another, in one embodiment, the invention includes an idle removing block operating at a first clock speed to remove idles from received data stream, a buffer coupled to the idle removing block to receive the data packets from the idle removing block, the buffer generating an idle removal control signal to the idle removing block to enable the removal of idles by the idle removing block, and an idle insertion block coupled to the buffer to receive data stream from the buffer and insert idles into the data packets, the idle insertion block receiving an idle insertion control signal from the buffer to enable the insertion of idles.

20 Claims, 3 Drawing Sheets

METHOD AND APPARATUS FOR ADAPTING TO A CLOCK RATE TRANSITION IN A COMMUNICATIONS NETWORK USING IDLES

BACKGROUND OF THE INVENTION

1. Field of the Invention

The present invention relates to the field of adapting a received input data stream at one clock rate to another clock rate. In particular, the present invention is related to using a buffer to write data in at one clock rate and read data out at another clock rate, while compensating for the rate variations using idles.

2. Background

In high-speed data communications, transitions can occur between clocks as data is conveyed across different channels. These transitions can cause clocking errors or data errors if the transitions are not compensated for. One such transition occurs in 10 Gb (Gigabit) Ethernet in the transition from the domain of the XGXS clock to that of the PMA clock. The required clock rates are the same, 156.25 MHz. However, the clocks are required to be accurate only to within +/−100 ppm. As a result, the clocks may differ in total by as much as +/−200 ppm. At the high data rates of 10 Gb Ethernet this difference can be very significant. The Ethernet standards set forth the clock rates, clock accuracy standards, bit rates, and data packet formats. The Ethernet standards also set forth that idles can be used to compensate for clock rate and other discrepancies and the permissible locations and structures for any idles that are used in a packet. However, there is no standard on how to insert and delete idles in order to accommodate such transitions between disparate clock domains.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION OF THE INVENTION

The present invention can be used to manage the idles handling in a PCS (Physical Coding Sublayer) module of a 10 GBASE-R Ethernet device, although it can also be used for other types of communicating systems. Ethernet refers to an IEEE (Institute of Electrical and Electronics Engineers) standard 802.3 that uses CSMA/DC (Carrier Sense Multiple Access with Collision Detection) access. 10 Gb Ethernet refers to a draft extension IEEE standard 802.3ae for higher speed communications. In the present invention, an idle handling unit removes or inserts idles in accordance with the IEEE standard in order to compensate different clock speeds on the transmission and receive side of a communications interface device. In one embodiment, the clock skew between transmit and receive can be up to +/−200 ppm.

The idle handling devices can be split into an idle removing (RI) block, a FIFO which can handle separate clock domains and an idle insertion (II) block. The RI block removes idles on the data source side if requested. It is followed by a FIFO buffer device, which handles the clock domain transition and the clock skew. After clock adaptation the II block inserts idles if necessary. In the example discussed below idles refers to idle words, i.e. a string of idle bits located between data and control words as prescribed by the 10 Gb Ethernet standards proposals. However, in other applications, the idles can be idle packets, idle bits or idle portions of words. The specific choice of how and where to remove or insert idles will depend on the particular use of the present invention.

The FIFO buffer can handle the complete control of the RI and the II block including all control logic. With this arrangement, there is only one FIFO device needed to adapt to both clocks. The present invention benefits in that idles insertion and deletion is done on separate sides of the FIFO buffer device.

Figure 1:
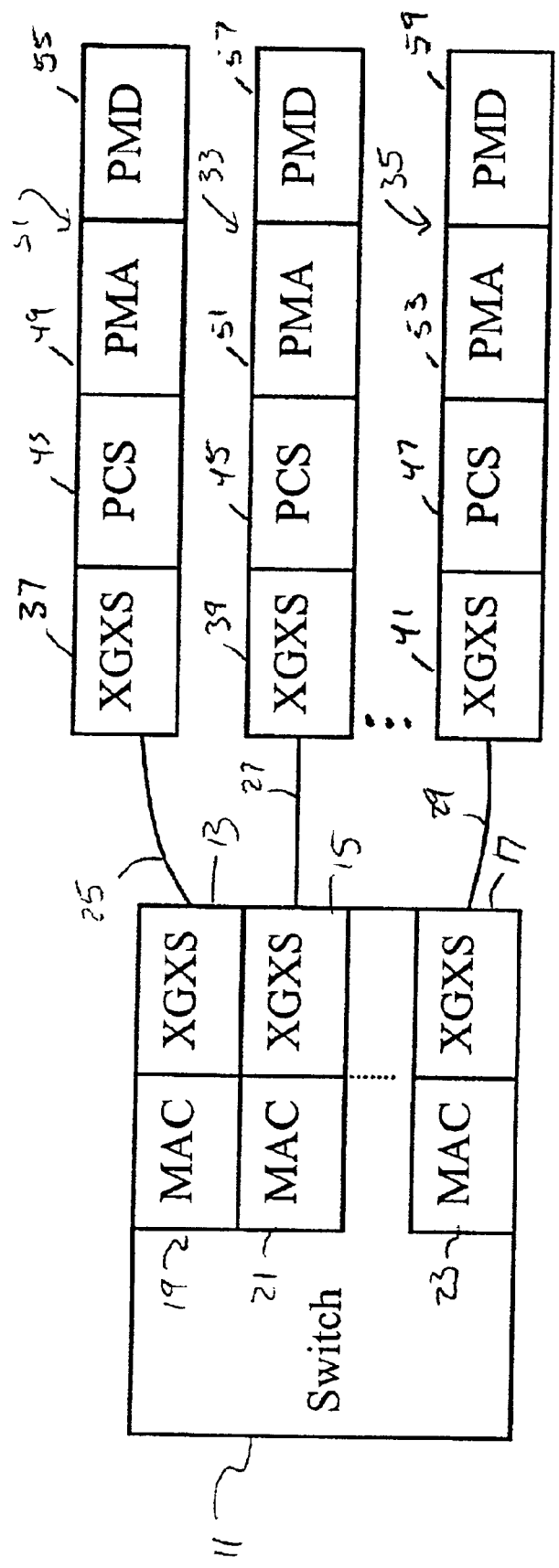
FIG. 1 is a block diagram of a multiple port switch suitable for one application of the present invention.

Referring to FIG. 1, a switch 11 has a plurality of ports 13, 15, 17, each coupled to a MAC (Media Access Control) sublayer 19, 21, 23 as is well known in the art. In order to accommodate a 10 Gb Ethernet connection to another card or another chip, each port can also be coupled to an XGXS (10 Gigabit Extension Sublayer) adapter. For shorter distances (e.g. within the same chip) the XGXS adapters can be excluded, as is also well known in the art. The ports are each coupled through a high capacity communications channel 25, 27, 29 such as XGXS interconnect lines on a printed circuit board to remote devices 31, 33, 35 that, in turn, can be coupled to a number of other devices, nodes, switches, terminals or routers. Each remote device includes a corresponding XGXS adapter 37, 39, 41 to interface to the switch. Each XGXS adapter is coupled to a PCS module 43, 45, 47. Each PCS module is, in turn coupled to a corresponding PMA (Physical Media Access) sublayer module 49, 51, 53, which provides multiplexing, de-multiplexing and driver functions. The PMAs are then coupled each to its own PMD (Physical Media Dependent) sublayer module 55, 57, 59 that provides an interface and modulation to a long distance communication medium such as optic fiber, broadband radio, high capacity coaxial cable or any other suitable transmission medium. The illustrated architecture is particularly appropriate for 10 Gb Ethernet applications and is well-known in the art in such applications. The invention should not be considered as limited to such an architecture but can be used in a wide variety of other systems and architectures. The components listed as separate components can also be integrated into single integrated circuits such as VLSI (very large scale integrated circuit) and hybrid integrated circuits. For example, while each remote device 31, 33, 35 is shown as four modules on a separate PCB (printed circuit board), it is contemplated that they can also each be provided as a single integrated circuit chip. Similarly, the switch 11 can be provided with large scale integration and the remote devices can be integrated with all or a portion of the chip.

Between the XGXS and the PMA module there is a transition from the 156.25 Hz clock domain of the XGXS module and the 156.25 MHz clock domain of the PMA module. As mentioned above the separate clocks of the two domains can differ by over +/−200 ppm in total. The present invention can be applied to make the clock rate transition as well as to compensate for any data rate discrepancies that are caused by the clock rate transition. The compensation of data rate discrepancies is, of course, limited by the amount of idles and inter-packet gaps provided for in any particular protocol.

Figure 2:
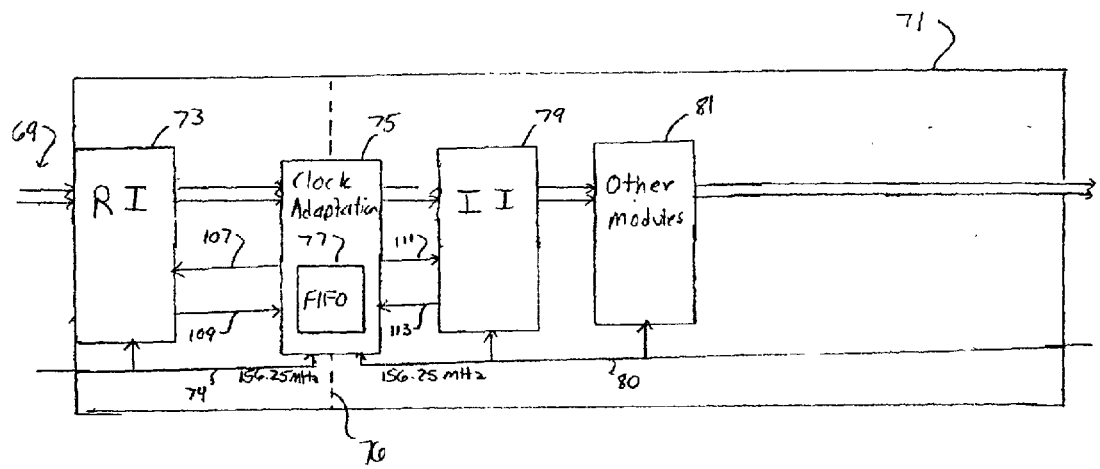
FIG. 2 is a block diagram of an example of a PCS module in a transmit configuration suitable for implementing the present invention.

The PCS data path can be considered as having a tx (transmit) path from the XGXS to the PMA and a rx (receive) path from the PMA to the XGXS. As shown in FIG. 2, in a tx-path, the PCS interface receives a data stream 69 in XGMII (10 Gigabit Media Independent Interface) format. This format has four eight-bit lanes with each bit double clocked to achieve a 312.5 Mbit/s data rate on 156.25 MHz lines. The data lanes can be consolidated and then can be divided into pairs of single data rate lines, as shown. The single data rate lines can also be divided up into several slower clock rate lines, as is well-known in the art. The idles removal block 73 analyses the data stream and removes idles, if it is requested to do so by the clock adaptation block 75. It then writes the data with or without idles into a FIFO buffer 77. While removing idles, all input into the FIFO buffer in the clock adaptation block is disabled. An idles insertion block 79 analyses the data stream that it reads from the FIFO buffer 77 and inserts idles, if requested to do so by the clock adaptation block.

In a 10 Gb Ethernet application, the PCS module 71 also includes other modules 81 to perform additional functions as required by the standards prior to providing the data to the PMA. These functions include encoding, scrambling, data rate conversion and packet reconfiguring. The particular form and function of these modules is not essential to the clock adaptation of the present invention and so will not be discussed in detail. In other applications, different modules can be used and the order of the modules can be changed. For example, while the other modules are shown as operating on the data after clock adaptation, any one or more of the modules can be configured or positioned to operate before clock adaptation. This output is then transmitted to the PMD as shown in FIG. 1. As will be described later, the modules can be used for both the transmit and receive path.

In the idles removal module 73, data words can be analyzed in blocks and, if necessary, idles can be removed from each data block. The idles removal module then rebuilds the data blocks under the conditions described for 10 Gb Ethernet in the proposed draft IEEE standard 802.3ae. The removal of idles starts upon receiving an overflow warning control signal from the FIFO buffer. In transmit mode, the module runs with a frequency of 156.25 MHz, provided over a clock bus 74 by the external XGXS clock circuit (not shown). This clock is typically accurate to +/−100 ppm.

In the idles insertion module 79, data words can be analyzed in blocks and, if necessary, idles can be inserted into each block. The module then rebuilds the blocks under the conditions described for 10 Gb Ethernet in the proposed draft IEEE standard 802.3ae. The insertion of idles starts upon receiving an underflow warning control signal from the FIFO buffer. In transmit mode, the idles insertion module 79 and the other modules 81 run with a frequency of 156.25 MHz, provided over a clock bus 80 by the external PMA clock circuit (not shown). This clock is also typically accurate to +/−100 ppm but any PMA clock skew will be unrelated to any skew of the XGXS clock. The two clock domains are on opposite sides of a dotted line 76 shown in FIG. 2.

As mentioned above, the clock adaptation block contains a FIFO buffer device 77 in which the input and output work independently of each other. This allows the input and output to work at different clock speeds. As described more completely below, control signals allow the input and output to work independently without conflict. If the FIFO buffer nearly overflows or underflows, a control signal can be set. Lock signals can also be used to deactivate any operation of a function. For example, a lock signal can be used by the II or RI block to disable any input or output operation of the FIFO buffer data.

Figure 3:
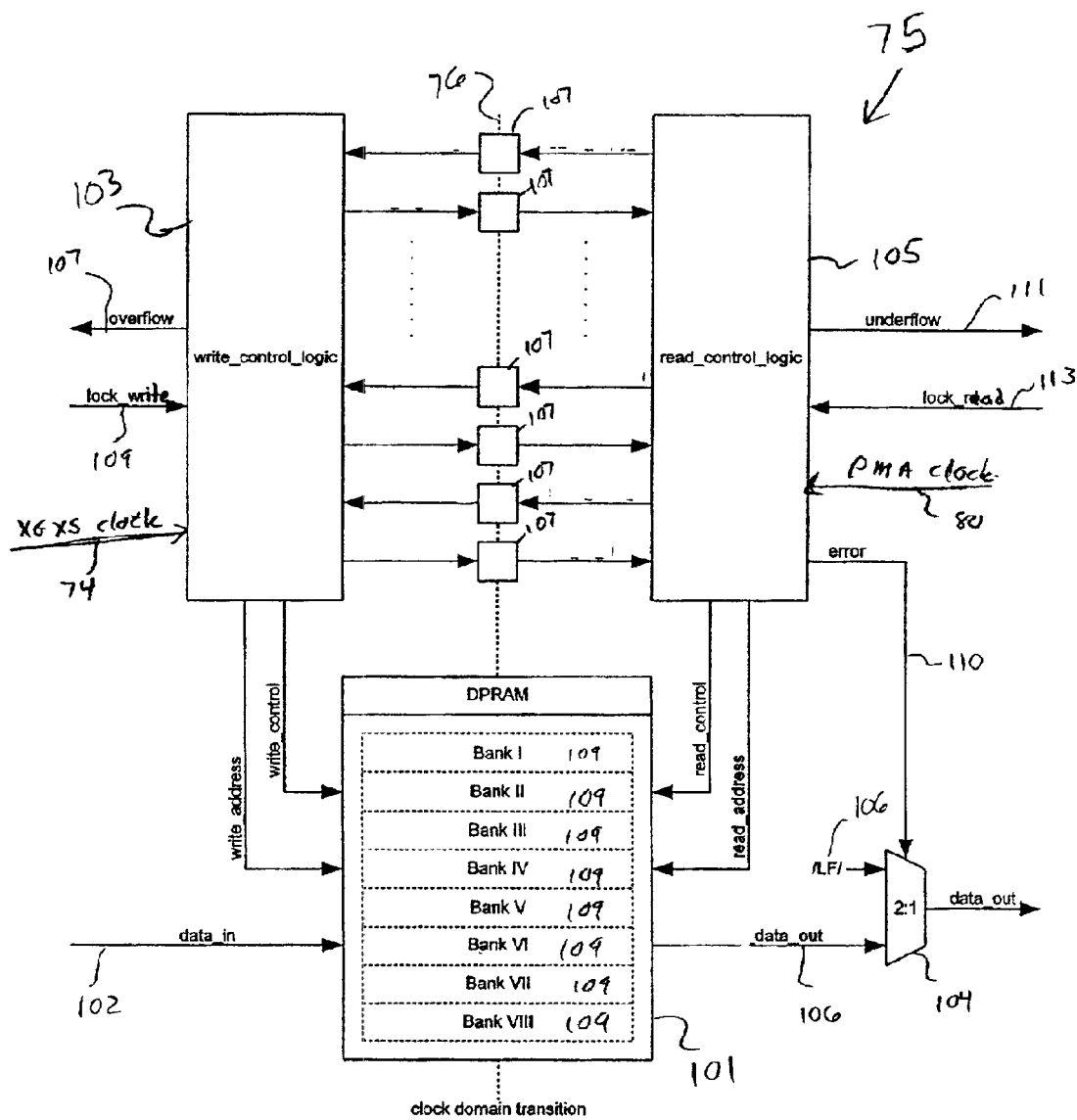
FIG. 3 is a block diagram of an example of a clock adaptation module of FIG. 2.

As shown in FIG. 3, the FIFO 75 contains a two-sided or dual-ported buffer such as a DPRAM (dual port random access memory) 101 and two RAM access control blocks, a write control block 103, and a read control block 105. The FIFO receives data on a data input line 102. Data is read from the FIFO on an output line 108 to a 2:1 multiplexer 104. Each RAM access control block includes a counter for RAM addressing and control logic for generating warning, and error status signals for underflow and overflow. For the write control block, the control signals include the overflow warning signal 107, to trigger the removal of idles, and an incoming write lock signal 109 to prevent any write operations to the DPRAM. Similarly, the read control block includes the underflow warning signal 111 to trigger the insertion of idles and an incoming read lock signal 113 to prevent any read operations from the DPRAM. The write control block 103 and the read control block 105 are used to ensure that reads and writes are not performed at the same address at the same time. As mentioned above, the write control block and the read control block operate in different clock domains as shown by the dotted line 76.

The write control block 103 receives the external XGXS clock signal 74 and the read control block 105 receives the different external PMA clock signal 80 both set to the clock rate of 156.25 MHz +/−200 ppm. The DPRAM, accordingly, can be read at a slightly different speed than it is written. The read/write controls discussed below prevent any collisions between the two clock domains.

The address range of the DPRAM in this example is divided into eight sections or banks 109. However, any number of banks can be used depending on the application. The number of banks can be selected to be sufficient to compensate for clock rate discrepancies. A set of read/write control signals, two for each of the eight sections, is accessed by the write control block and read control block to determine access to each of the eight sections, respectively. In the present example shown in FIG. 3, the signals are connected across the clock domain 76 by a set of eight banks 107, this provides 16 synchronization units, two for each bank. When a write cycle has filled the first bank completely, the first read/write control signal is set. The write block continues by filling the following banks. The read block has access to bank 1 after the bank is written, and the signal is set as full. The signal is set as empty when all data of this bank has been read. Both control processes have to set the status signals early enough to allow for signal synchronization between the two different clock domains. If a read bank and a write bank-access occur at the same bank at substantially the same time, then an error 110 can occur. This can be indicated to a 2:1 multiplexer 104 on an error line 110 from the read control block. When an error is indicated /LF/ (local fault words) are inserted from an /LF/ source 106. The local fault words are defined in the 10 Gb Ethernet standard. For other applications, other types of error signaling can be used. The generation of overflow and underflow warning signals are described below.

The write control block 103 generates an overflow warning signal or overflow signal when too many banks have been filled. The selection of how many constitutes too many will depend on the application. The overflow signal is released when enough banks are emptied. The overflow signal acts as an idle removal control signal to the idles removal block to remove idles from the stream. This reduces the rate of data input to the DPRAM. However, many other mechanisms can be employed to trigger the idle removal. The read block 105 similarly generates an underflow warning signal or underflow signal if too many banks are empty. The underflow signal is released as the banks are filled to a sufficient level. The selection of how much constitutes a sufficient level will depend on the application. The underflow signal acts as an idle insertion control signal to the idle insertion block to insert idles into the stream from the DPRAM. This reduces the rate at which data must be read from the DPRAM to provide downstream blocks. In addition, the read block includes the error line 110 to trigger the insertion of /LF/ data by the 2:1 multiplexer 104. The error line is set whenever an actual overflow is detected. This happens when, despite the overflow warning signal 107, data is written faster than it can be read so that a bank gets written and read at the same time. The /LF/ data will eventually cause the erroneous data packet to be resent from its original source.

The overflow and underflow signals are generated by a combinatorial logic, used to control state machines. The logic relies on the read/write control register states in order to anticipate the need for idle insertion and idle removal. However, many other mechanisms can be employed to trigger the overflow and underflow signals. The signals allow the clock adaptation block to accommodate different clock rates and different data rates simply and efficiently.

The underflow and overflow signals are based on the rules for inserting and removing idles, the size of the data packets, the capacity for inserting and removing idles and the speed and latency of the circuitry. With a possible maximum clock speed difference of +/−200 ppm, the 156.25 MHz clocks may differ by as much as 31.25 KHz. Typically, idles cannot be inserted into a data packet but only before or after a packet. In a typical 10 Gb Ethernet application as described in the proposed draft IEEE standard 802.3ae, data packets are from 64 to 1518 octets wide. 8 octets are transmitted for each clock cycle (at 156.25 MHz SDR). With a maximum clock skew, the system must store at least two packets or from 8 to 190 clocks of data on the write side to avoid errors before idles can be removed. The overflow warning threshold is set so that idles can be removed in time to compensate the discrepancy. Similarly the underflow warning threshold is set so that idles can be inserted in time to compensate the discrepancy. The error signal is set at a higher threshold than the warning signals. This allows an overflow or underflow to be corrected before an error occurs. For other applications, the sizes of the various buffers can be adapted to accommodate the rules for idles in the particular application.

Figure 4:
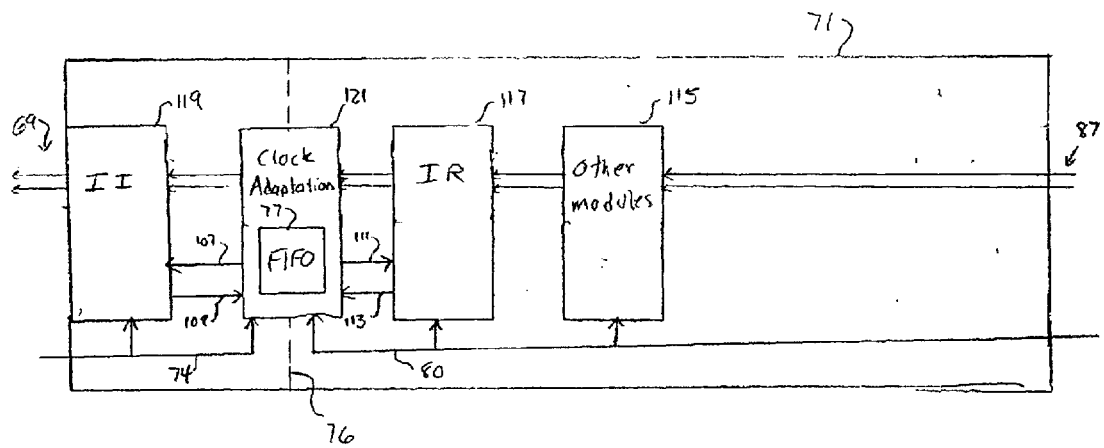
FIG. 4 is a block diagram of an example of the PCS module of FIG. 2 in a receive configuration suitable for implementing the present invention.

For a rx path, the PCS module operates in the same way as shown in FIG. 2, but in the opposite direction. The PCS module is accordingly reconfigured as shown in FIG. 4. The PCS module receives data 87 from the PMA sublayer of the physical layer. This is shown, as above, as two blocks at a 156.25 MHz single data rate, however other configurations are also possible. These are processed by the other modules 115 as desired for the particular application. In 10 Gb Ethernet, the other modules include descrambling, decoding, data rate conversion, and packet reconfiguration. For other applications other modules may be provided. The data blocks are received by an idle removal block 117. Idles are removed or inserted from the data in the idle removal 117 and insertion 119 blocks, as requested by the clock adaptation block 121. The idle insertion and removal blocks are coupled to each other through the clock adaptation block and its FIFO buffer 77. The adapted packets are transmitted then through output data blocks 69. As will be understood from the description above, the functional blocks in FIG. 4 can be built around the corresponding FIG. 2 blocks to accomplish the same functions in reverse. As with the transmit path, there is a clock domain transition 76 and the FIFO buffer within the clock adaptation block is used to make the transition. In other applications, the positions and functions of the other modules 115 can be modified or distributed as appropriate.

It should be noted that, while the steps described herein may be performed under the control of a programmed processor, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to adapting transmission from 10 Gigabit Ethernet, the method and apparatus described herein are equally applicable to hubs, nodes, routers and to peers on any other type of network, intranet, Internet, LAN, WAN and mobile wireless networks.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. An apparatus comprising:

an idle removal block operating at a first clock speed to remove idles from received data packets;

a buffer coupled to the idle removal block to receive the data packets from the idle removal block, the buffer generating an idle removal control signal to the idle removal block to enable the removal of idles by the idle removal block;

an idle insertion block operating at a second clock speed coupled to the buffer to receive data packets from the buffer and insert idles into the data packets, the idle insertion block to receive an idle insertion control signal from the buffer to enable the insertion of idles.

2. The apparatus of claim 1 wherein the buffer comprises a dual port memory, wherein the idle removal block is coupled to one port of the dual port memory and wherein the idle insertion block is coupled to the other port of the dual port memory.

3. The apparatus of claim 1 wherein the buffer comprises write control logic for writing packets from the idle removal block into the buffer and wherein the write control logic generates the idle removal control signal based on the write capacity of the buffer.

4. The apparatus of claim 3 wherein the write capacity includes the memory currently available to the write control logic for writing packets into the buffer.

5. The apparatus of claim 1 wherein the buffer comprises read control logic for reading packets from the buffer and wherein the read control logic generates the idle removal control signal based on the read capacity of the buffer.

6. The apparatus of claim 5 wherein the read capacity includes the memory currently filled for the read control logic to read packets from the buffer.

7. The apparatus of claim 1 wherein the buffer receives the data packets from the idle removal block based on the first clock frequency, and wherein the idle insertion block receives data packets from the buffer at the second clock frequency.

8. An apparatus comprising:

means, operating at a first clock speed, for removing idles from received data packets;

means for buffering data packets coupled to the means for removing for receiving the data packets from the means for removing, the means for buffering generating an idle removal control signal to the means for removing to enable the removal of idles by the means for removing;

means, operating at a second clock speed, coupled to the means for buffering for receiving data packets from the means for buffering and for inserting idles into the data packets, the means for inserting receiving an idle insertion control signal from the means for buffering to enable the insertion of idles.

9. The apparatus of claim 8 wherein the means for buffering comprises a dual port memory, wherein the means for removing is coupled to one port of the dual port memory and wherein the means for inserting is coupled to the other port of the dual port memory.

10. The apparatus of claim 8 wherein the means for buffering comprises means for writing packets from the means for removing into the means for buffering and wherein the means for writing generates the idle removal control signal based on the write capacity of the means for buffering.

11. The apparatus of claim 8 wherein the write capacity includes the memory currently available to the means for writing for writing packets into the means for buffering.

12. The apparatus of claim 8 wherein the means for buffering comprises means for reading packets from the buffer and wherein the means for reading generates the idle insertion control signal based on the read capacity of the means for buffering.

13. The apparatus of claim 8 wherein the read capacity includes the memory currently filled for the means for reading to read packets from the means for buffering.

14. The apparatus of claim 8 wherein the means for buffering receives the data packets from the means for removing based on the first clock frequency, and wherein the means for inserting receives data packets from the means for buffering at the second clock frequency.

15. A method comprising:

receiving a data packet;

detecting a buffer capacity relative to the packet;

removing idles from the packet depending on the detected buffer capacity;

writing the packet into the buffer at a first clock rate and;

reading the packet from the buffer at a second clock rate.

16. The method of claim 15, further comprising halting the writing of the packet during removing idles.

17. The method of claim 15 further comprising inserting idles into the packet after reading the packet at the second clock rate.

18. The method of claim 15, further comprising halting the reading of the packet during inserting idles.

19. The method of claim 15, further comprising generating an error signal if the buffer capacity is exceeded.

20. The method of claim 15 wherein detecting a buffer capacity relative to the packet comprises determining the memory currently available for writing packets into the buffer.

* * * * *

UNITED STATES PATENT AND TRADEMARK OFFICE
CERTIFICATE OF CORRECTION

PATENT NO. : 6,891,845 B2
DATED : May 10, 2005
INVENTOR(S) : Boock et al.

It is certified that error appears in the above-identified patent and that said Letters Patent is hereby corrected as shown below:

Column 7,
Line 38, delete "removal" and insert -- insertion --.

Signed and Sealed this

Sixteenth Day of August, 2005

JON W. DUDAS
*Director of the United States Patent and Trademark Office*